(12) United States Patent
Fakoorian et al.

(10) Patent No.: US 11,910,350 B2
(45) Date of Patent: Feb. 20, 2024

(54) PHYSICAL LAYER SIGNALING BY BASE STATIONS FOR PROVISIONING POSITIONING-RESOURCES

(71) Applicant: Apple Inc., Cupertino, CA (US)

(72) Inventors: Seyed Ali Akbar Fakoorian, San Diego, CA (US); Wei Zeng, San Diego, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 335 days.

(21) Appl. No.: 17/496,306

(22) Filed: Oct. 7, 2021

(65) Prior Publication Data

US 2022/0116904 A1 Apr. 14, 2022

Related U.S. Application Data

(60) Provisional application No. 63/089,083, filed on Oct. 8, 2020.

(51) Int. Cl.
*H04W 64/00* (2009.01)
*H04L 5/00* (2006.01)
(Continued)

(52) U.S. Cl.
CPC ......... *H04W 64/003* (2013.01); *H04L 5/0048* (2013.01); *H04W 28/0975* (2020.05); *H04W 36/06* (2013.01); *H04W 72/23* (2023.01)

(58) Field of Classification Search
CPC .................................................. H04W 64/00
See application file for complete search history.

(56) References Cited

U.S. PATENT DOCUMENTS

| 9,439,039 B1 | 9/2016 | Patil et al. |
| 2019/0037338 A1 | 1/2019 | Edge |

(Continued)

FOREIGN PATENT DOCUMENTS

WO 2020146739 A1 7/2020

OTHER PUBLICATIONS

International Preliminary Report on Patentability for PCT/US2021/054172; dated Mar. 28, 2023.
(Continued)

*Primary Examiner* — Kevin Kim
(74) *Attorney, Agent, or Firm* — Kowert, Hood, Munyon, Rankin & Goetzel, P.C.

(57) ABSTRACT

Improved positioning resolution and latency may be achieved via physical layer signaling between a mobile device (UE) and a base station. The physical layer procedures may aid target UEs in enhancing their positioning accuracy and latency, and/or reducing network overhead while boosting UE power efficiency. Accordingly, a base station may receive, via physical layer signaling from a UE, a request for positioning-resources, for example in response to a determination that current positioning-resources of the UE need to be adjusted. The base station may responsively transmit, via physical layer signaling to the UE, an indication of adjusted positioning-resources, and may optionally transmit an indication of corresponding allocated grant-resources. The base station may receive, via physical layer signaling from the UE, positioning information resulting from positioning measurements performed by the UE according to the adjusted positioning-resources. The base station may optionally receive the positioning information on the corresponding allocated grant-resources.

20 Claims, 8 Drawing Sheets

(51) Int. Cl.
*H04W 28/08* (2023.01)
*H04W 36/06* (2009.01)
*H04W 72/23* (2023.01)

(56) References Cited

U.S. PATENT DOCUMENTS

| | | |
|---|---|---|
| 2019/0173612 A1 | 6/2019 | Kimura et al. |
| 2019/0364449 A1 | 11/2019 | Yang et al. |
| 2019/0380056 A1 | 12/2019 | Lee et al. |
| 2020/0154240 A1 | 5/2020 | Edge |
| 2020/0178199 A1 | 6/2020 | Chae et al. |
| 2020/0367278 A1* | 11/2020 | Hosseini ............. H04W 72/046 |
| 2021/0112474 A1* | 4/2021 | Manolakos ........... H04L 5/0053 |
| 2021/0392454 A1* | 12/2021 | Choi .................... H04L 5/0094 |

OTHER PUBLICATIONS

International Search Report and Written Opinion for PCT/US2021/054256; 13 pages; dated Jan. 20, 2022.

\* cited by examiner

```
┌─────────────────────────────────────────────────────────────────────┐
│ Base station receives, via physical layer signaling from a UE, a request for positioning-
│ resources  (e.g. for updated/adjusted positioning resources) for the UE.
│                                   902
└─────────────────────────────────────────────────────────────────────┘
                                    │
                                    ▼
┌─────────────────────────────────────────────────────────────────────┐
│ Base station determines adjusted positioning-resources, and optionally determines
│ corresponding allocated grant-resources, for the UE, based on the received request.
│                                   904
└─────────────────────────────────────────────────────────────────────┘
                                    │
                                    ▼
┌─────────────────────────────────────────────────────────────────────┐
│ Base station transmits, via physical layer signaling to the UE, an indication of the
│ adjusted positioning-resources and optionally transmits an indication of the
│ corresponding allocated grant-resources.
│                                   906
└─────────────────────────────────────────────────────────────────────┘
                                    │
                                    ▼
┌─────────────────────────────────────────────────────────────────────┐
│ Base station receives, via physical layer signaling from the UE, positioning information
│ (e.g. positioning measurements and/or location of the UE).  The positioning information
│ is received on the corresponding allocated grant-resources when applicable.
│                                   908
└─────────────────────────────────────────────────────────────────────┘
```

FIG. 9

PHYSICAL LAYER SIGNALING BY BASE STATIONS FOR PROVISIONING POSITIONING-RESOURCES

PRIORITY DATA

This application claims benefit of priority to U.S. Provisional Application Ser. No. 63/089,083, titled "Physical Layer Signaling by Base Stations for Provisioning Positioning Resources", filed Oct. 8, 2020, which is hereby incorporated by reference in its entirety as though fully and completely set forth herein.

FIELD

The present application relates to wireless communications, including physical layer signaling by base stations for provisioning positioning resources during wireless communications, e.g., during 3GPP NR communications.

BACKGROUND

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A proposed telecommunications standard moving beyond the International Mobile Telecommunications-Advanced (IMT-Advanced) Standards is 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than LTE standards.

SUMMARY

Aspects are presented herein of, inter alia, of methods for implementing solutions for physical layer signaling procedures that enable devices to request downlink and/or uplink positioning-resources from base stations, and further enable the base stations to provision positioning-resources accordingly, during wireless communications, for example in 3GPP New Radio (NR) communications. Aspects are further presented herein for wireless communication systems containing user equipment (UE) devices and/or base stations communicating with each other within the wireless communication systems as proposed herein to implement physical layer signaling in the request and provisioning of positioning-resources. Physical layer procedures may aid target UEs in enhancing their positioning accuracy and latency, and/or reducing network overhead while boosting the power efficiency of the UEs.

Accordingly, a base station may receive, via physical layer signaling from a device, a request for positioning-resources for the device, responsive to a determination to adjust current positioning-resources of the device. The base station may determine adjusted positioning-resources, and may also optionally determine corresponding allocated grant-resources, for the UE, based on the received request. The base station may subsequently transmit, via physical layer signaling to the device and responsive to the request, an indication of adjusted positioning-resources, and may optionally further transmit an indication of the corresponding allocated grant-resources. Subsequently, the base station may receive, via physical layer signaling from the device, positioning information indicative of positioning measurements performed by the device using the adjusted positioning-resources, and/or indicative of a location of the device determined using the adjusted positioning-resources. In some cases, the base station may receive the positioning information over the corresponding allocated grant-resources. The current positioning-resources may need to be adjusted because current positioning-resources may be insufficient for required positioning accuracy and/or positioning latency of the device (in order to increase accuracy and reduce latency), or because they exceed what is necessary for required positioning accuracy and/or positioning latency of the device (in order to increase power efficiency of the device), or because the device has determined that it intends to adjust its power consumption.

The request (by the device) may either be implicitly indicated in specific positioning measurement and/or location information received by the base station via the physical layer signaling, or explicitly indicated as resource information received by the base station on one or more physical uplink channels via the physical layer signaling. The resource information may be included as part of control state information received on a physical uplink control channel or data payload received on a physical uplink data channel. The specific positioning measurement and/or location information may include an indication of a change in serving cell for the device, or a current positioning resolution for the device. The resource information may include, but not be limited to, an index of positioning-resources and/or resource sets requested by the device, a spatial receive direction preferred by the device, a transmit/receive panel index corresponding to where the device expects to receive positioning reference signals (PRSs) from, PRS bandwidth, PRS duration per slot, PRS periodicity, number of PRS repetitions per periodicity, a PRS demand transmitted via a special scheduling request (SR) on a physical uplink control channel (PUCCH), such as PUCCH format 0 or PUCCH format 1, a PRS demand transmitted via a special physical random access control channel (PRACH), e.g., such as a reserved preamble or RACH occasion; or and/or time duration for which the PRS is required by the device.

In some aspects, the indication of adjusted positioning-resources may be transmitted via physical layer signaling by the base station to the device or from a location management function according to a long term evolution positioning protocol (LPP). Transmitting the indication of adjusted positioning-resources via physical layer signaling from the base station to the device may include transmitting the indication as part of device specific downlink control information (DCI), group-common DCI, and/or as part of a media access control (MAC) control element. The base station may also transmit, to the device and responsive to the request, an indication of grant-resources which the device is expected to use when transmitting the positioning information. In some aspects, the indication of grant-resources may be transmitted by the base station together with the indication of adjusted positioning-resources. The indication of grant-resources and the indication of adjusted positioning-resources may both be indicated by downlink control information transmitted by the base station on a physical downlink control channel.

In some aspects, the positioning information may be received by the base station a specified number of symbols after an end of a measurement period during which the positioning measurements are performed by the device. The specified number may be determined based on a capability of the device. The positioning measurements may have been performed by the device during a preconfigured measurement period reserved for performing measurements, or during a dynamically allocated measurement period specifically provisioned for performing the positioning measurements using the adjusted positioning-resources. In some aspects, the base station may not transmit downlink communications other than positioning reference signals during the specifically provisioned measurement period.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 9 shows a flow diagram of an exemplary method for a base station provisioning positioning-resources for a UE in response to a request received from the UE via physical layer signaling, according to some aspects.

Figure 1:
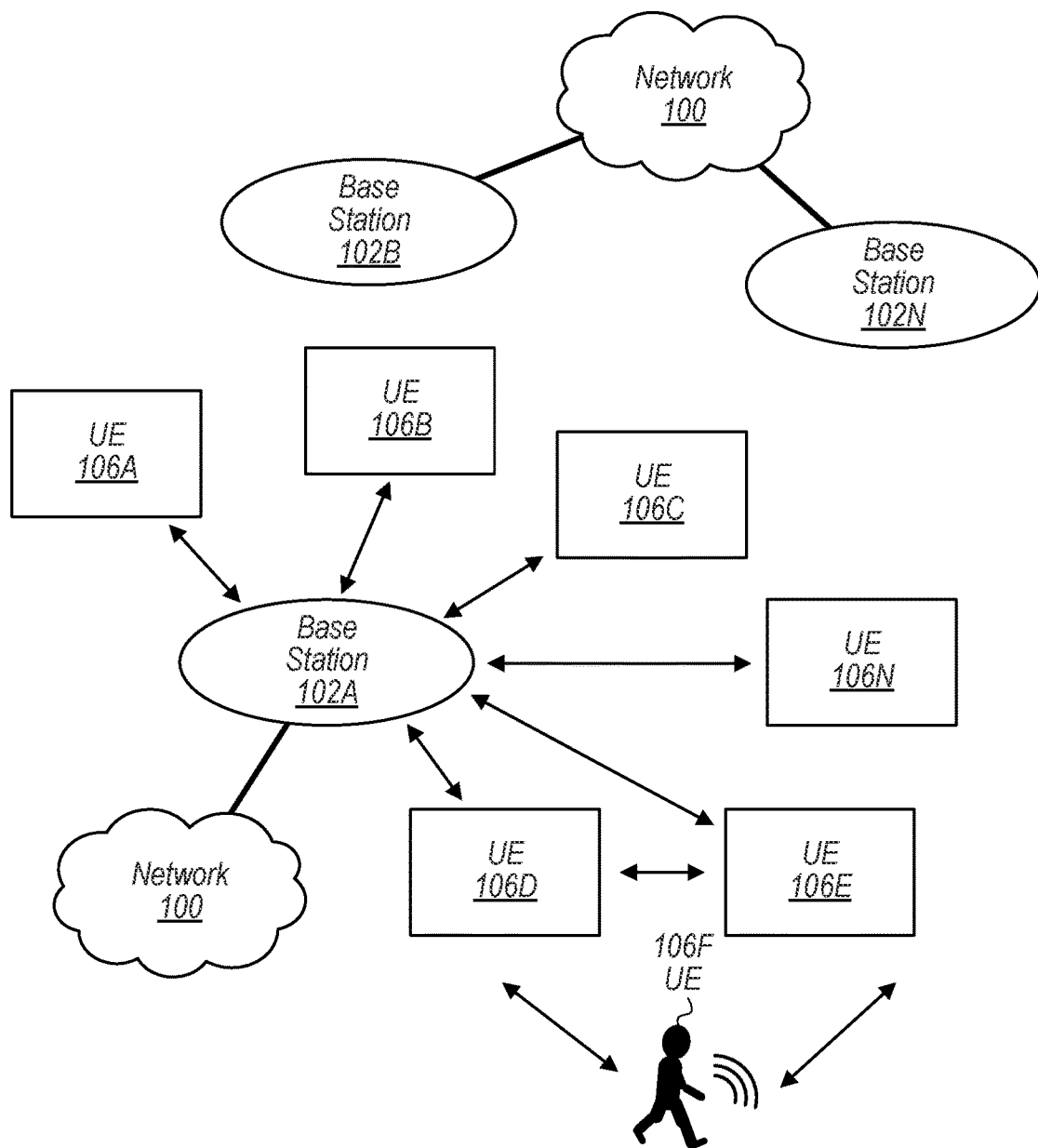
FIG. 1 illustrates an exemplary (and simplified) wireless communication system, according to some aspects.

While features described herein are susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

ACK: Acknowledge
AMF: Access Mobility and Management Function
APR: Applications Processor
AUL: Autonomous Uplink Transmission
BLER: Block Error Rate
BS: Base Station
BSR: Buffer Status Report
BWP: Bandwidth Part
CAPC: Channel Access Priority Class
CG: Configured Grant
CMR: Change Mode Request
CORESET: Control Channel Resource Set
COT: Channel Occupancy Time
CRC: Cyclic Redundancy Check
CS-RNTI: Configured Scheduling Radio Network Temporary Identifier
CSI: Channel State Information
DCI: Downlink Control Information
DG: Dynamic Grant
DL: Downlink (from BS to UE)
DMRS: Demodulation Reference Signal
DYN: Dynamic
ED: Energy Detection
FDM: Frequency Division Multiplexing
FT: Frame Type
GC-PDCCH: Group Common Physical Downlink Control Channel
GPRS: General Packet Radio Service
GSM: Global System for Mobile Communication
GTP: GPRS Tunneling Protocol
HARQ: Hybrid Automatic Repeat Request
IR: Initialization and Refresh state
LAN: Local Area Network
LMF: Location Management Function
LPP: LTE Positioning Protocol
LTE: Long Term Evolution
MAC: Media Access Control
MAC-CE: MAC Control Element
MCS: Modulation and Coding Scheme
MIB: Master Information Block
MIMO: Multiple-In Multiple-Out
NDI: New Data Indication
OFDM: Orthogonal Frequency Division Multiplexing
OSI: Open System Interconnection
PBCH: Physical Broadcast Channel
PDCCH: Physical Downlink Control Channel
PDCP: Packet Data Convergence Protocol
PDN: Packet Data Network
PDSCH: Physical Downlink Shared Channel
PDU: Protocol Data Unit PRB: Physical Resource Block
PUCCH: Physical Uplink Control Channel
PUSCH: Physical Uplink Shared (data) Channel
QCL: Quasi Co-Location
RACH: Random Access Procedure
RAT: Radio Access Technology
RB: Resource Block
RE: Resource Element
RF: Radio Frequency
RMSI: Remaining Minimum System Information
RNTI: Radio Network Temporary Identifier
ROHC: Robust Header Compression
RRC: Radio Resource Control
RS: Reference Signal (Symbol)
RSI: Root Sequence Indicator
RTP: Real-time Transport Protocol
RV: Redundancy Version
RX: Reception/Receive
SDM: Spatial Division Multiplexing
SID: System Identification Number
SGW: Serving Gateway
SR: Scheduling Request
SRS: Sounding Reference Signal
SS: Search Space
SSB: Synchronization Signal Block
TBS: Transport Block Size
TCI: Transmission Configuration Indication
TDM: Time Division Multiplexing
TRS: Tracking Reference Signal
TX: Transmission/Transmit
UCI: Uplink Control Information
UE: User Equipment
UL: Uplink (from UE to BS)
UMTS: Universal Mobile Telecommunication System
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g., Sony PlayStation™ Microsoft XBox™, etc.), portable gaming devices (e.g., Nintendo DS™, PlayStation Portable™, Gameboy Advance™, iPod™), laptops, wearable devices (e.g., Apple Watch™ Google Glass™), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g., LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g., circuits) or combinations of elements that are capable of performing a function in a device, e.g., in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g., by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g., 10 ms). A radio frame in 3GPP LTE may be further divided into a specified number of (e.g., ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g., a time period of specific length) per 1 subcarrier (in reference to a frequency resource, e.g., a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
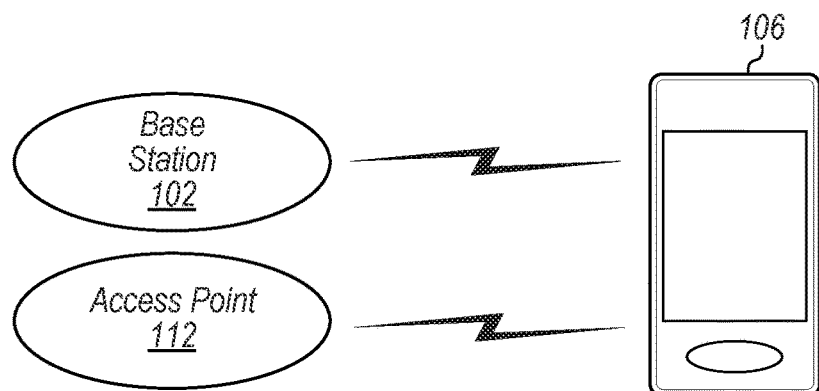
FIG. 2 illustrates an exemplary base station in communication with an exemplary wireless user equipment (UE) device, according to some aspects.

FIGS. 1 and 2—Exemplary Communication Systems

3GPP LTE/NR defines a number of downlink (DL) physical channels, categorized as transport or control channels, to carry information blocks received from the MAC and higher layers. 3GPP LTE/NR also defines physical layer channels for the uplink (UL). The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information (DCI) message. For example, the DCI may include a transmission configuration indication (TCI) relating to beamforming, with the TCI including configurations such as quasi-co-located (QCL) relationships between the downlink reference signals (DL-RSs) in one Channel State Information RS (CSI-RS) set and the PDSCH Demodulation Reference Signal (DMRS) ports. Each TCI state can contain parameters for configuring a QCL relationship between one or two downlink reference signals and the DMRS ports of the PDSCH, the DMRS port of PDCCH or the CSI-RS port(s) of a CSI-RS resource. Multiple PDCCHs can be transmitted in the same subframe using Control Channel Elements (CCE), each of which is a set of resource elements known as Resource Element Groups (REG). The PDCCH can employ quadrature phase-shift keying (QPSK) modulation, with a specified number (e.g., four) of QPSK symbols mapped to each REG. Furthermore, a specified number (e.g., 1, 2, 4, or 8) of CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the base station (e.g., eNB or gNB). The base station uses the uplink scheduling grant (e.g., in DCI) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

One important aspect of wireless communications is device positioning. Positioning refers to the process of determining the geographical location of a device. Once the coordinates of a device have been established, they can be mapped to a location such as a road, building, landmark, or object, and delivered back to the requesting service. The mapping function and delivery of location information are part of what is referred to as location services (LCS). Services using location data are referred to as location-aware services, and customer services that are location aware are referred to as location-based services (LBSs). Services based on positioning are a benefit to users, and LBSs are useful in optimizing network performance and enhancing automated services such as network self-learning and self-optimization, among others. Positioning in wireless networks is challenging due to the mobility of users and the dynamic nature of environment factors and radio signals.

In cellular communications, for example in 3GPP LTE, a positioning architecture has been established with three primary network elements: the LCS client, LCS target and LCS server. The LCS server can be a physical or logical entity that manages positioning for an LCS target device, collecting measurements and other location information, assisting the UE in measurement calculations as necessary, estimating the LCS target location. An LCS client can be a software and/or hardware entity interacting with an LCS server to obtain location information for LCS targets. The LCS client may reside in the LCS target, transmitting a request to the LCS server to obtain location information. The LCS server in turn processes the request and sends the positioning result back to the LCS client. A positioning request can originate from either the UE or the network. The positioning architecture can facilitate the positioning of UEs according to established protocols. One such protocol is the LTE Positioning Protocol (LPP) devised for 3GGP LTE communications. LPP is a point-to-point protocol for communication between an LCS server and an LCS target device, and is used for positioning the target device. It is used in the user layer and/or control layer, with multiple LPP procedures allowed in series and/or in parallel to reduce latency.

The study of techniques relating to positioning enhancements has been proposed for Release 17 of the 3GPP NR standard (Rel-17 NR). The points of study specifically include identifying and evaluating positioning techniques, downlink/uplink (DL/UL) positioning reference signals, signaling and procedures for improved accuracy, reduced latency, network efficiency, and device efficiency, while also considering a study of methodologies for network-assisted and UE-assisted integrity. The main study objectives have thus been identified as higher positioning accuracy, reduced latency, higher network (NW) efficiency, higher device efficiency, and higher positioning integrity.

FIG. 1 illustrates an exemplary (and simplified) wireless communication system, according to some aspects. It is noted that the system of FIG. 1 is merely one example of a possible system, and aspects may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may operate using physical layer signaling for requesting positioning-resources as disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g., remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if a base station(s) 102 are implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some aspects, the base station(s) 102 may implement signaling for provisioning positioning-resources requested via physical layer signaling by UEs, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g., over 2.4 GHz vs. over 5 GHz) may be considered as corresponding to different RATs. Furthermore, cellular communications performed according to a given RAT (e.g., LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/aspects under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services. Base station 102A and other similar base stations (such as base stations 102B . . . 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 102B-102N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE(s) 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UEs 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

Furthermore, as also illustrated in FIG. 1, at least some of the UE(s) 106, e.g., 106D and 106E may represent vehicles communicating with each other and with base station 102A, via cellular communications such as 3GPP LTE and/or 5G-NR for example. In addition, UE 106F may represent a pedestrian who is communicating and/or interacting with the vehicles represented by UEs 106D and 106E in a similar manner. Further aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106A through 106N) in communication with the base station 102 and an access point 112, according to some aspects. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the methods described herein by executing such stored instructions. Alternatively, or in addition, the UE 106 may include a programmable hardware element such as an FPGA (field-programmable gate array) that is configured to perform any of the methods described herein, or any portion of any of the methods described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some aspects, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using either of LTE or CDMA2000 1xRTT or NR, and separate radios for communicating using each of Wi-Fi and BLUETOOTH™. Other configurations are also possible.

Figure 3:
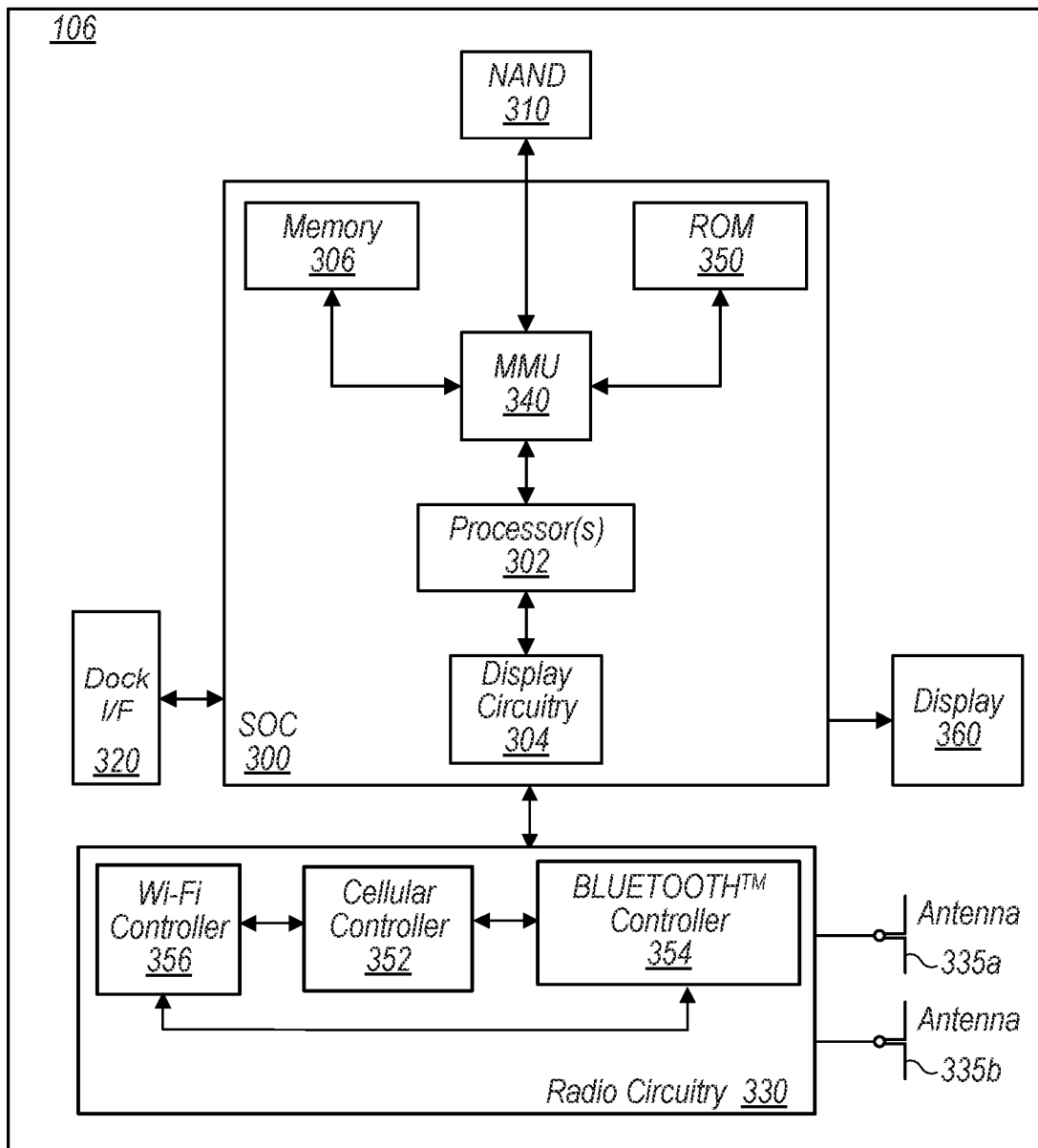
FIG. 3 illustrates an exemplary block diagram of a UE, according to some aspects.

FIG. 3—Block Diagram of an Exemplary UE

FIG. 3 illustrates a block diagram of an exemplary UE 106, according to some aspects. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some aspects, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some aspects.

As further described herein, the UE 106 (and/or base station(s) 102) may include hardware and software components for operating using control signaling that enhances physical control channel (e.g., PDCCH) transmission and reception, as further detailed herein. The processor(s) 302 of the UE device 106 may be configured to implement part or all of the methods described herein, e.g., by executing program instructions stored on a memory medium (e.g., a non-transitory computer-readable memory medium). In other aspects, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement use of physical layer signaling to request positioning-resources according to various aspects disclosed herein. Processor(s) 302 may also implement various other applications and/or end-user applications running on UE 106.

Figure 5:
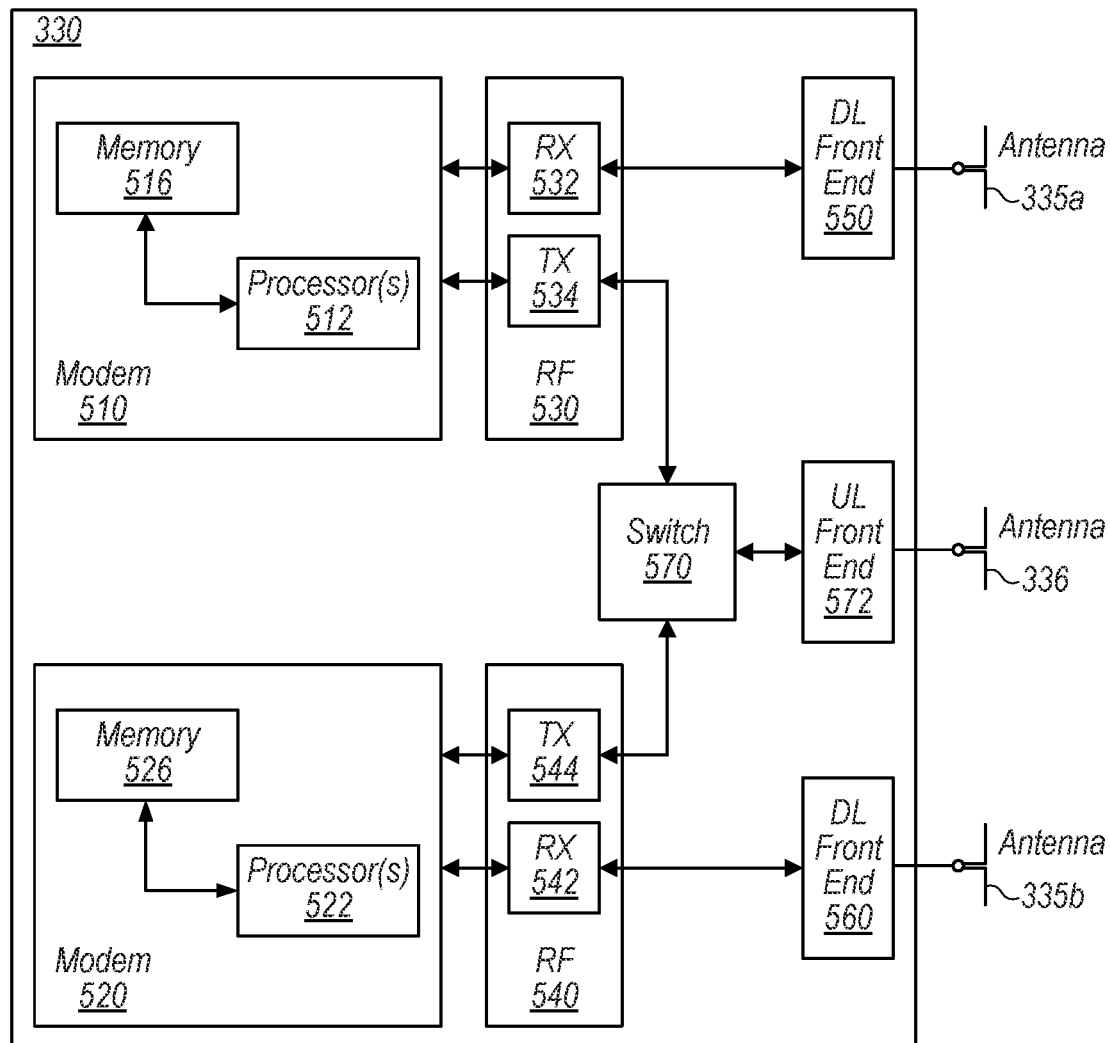
FIG. 5 shows an exemplary simplified block diagram illustrative of cellular communication circuitry, according to some aspects.

In some aspects, radio circuitry 330 may include separate controllers dedicated to controlling communications for various respective RAT standards. For example, as shown in FIG. 3, radio circuitry 330 may include a Wi-Fi controller 356, a cellular controller (e.g., LTE and/or NR controller) 352, and BLUETOOTH™ controller 354, and in at least some aspects, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other aspects have fewer or more similar controllers for various different RATs that may be implemented in UE device 106. For example, at least one exemplary block diagram illustrative of some aspects of cellular controller 352 is shown in FIG. 5 and will be further described below.

Figure 4:
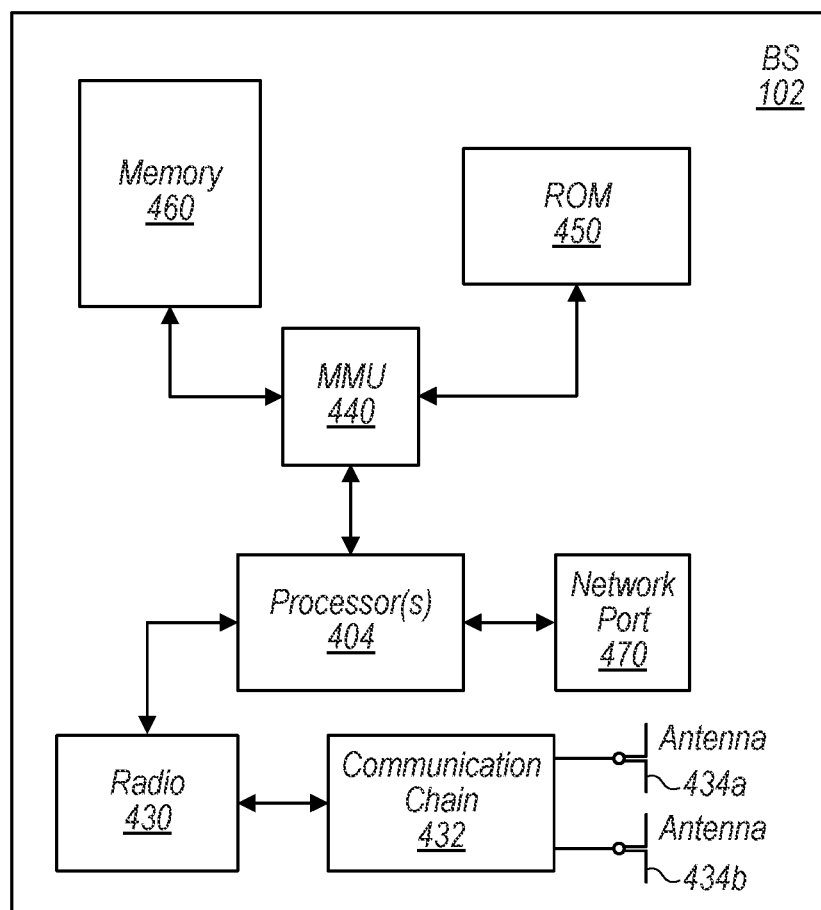
FIG. 4 illustrates an exemplary block diagram of a base station, according to some aspects.

FIG. 4—Block Diagram of an Exemplary Base Station

FIG. 4 illustrates a block diagram of an exemplary base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g., illustrated by antennas 434 a and 434 b) for performing wireless communication with mobile devices and/or other devices. Antennas 434 a and 434 b are shown by way of example, and base station 102 may include fewer or more antennas. Overall, the one or more antennas, which may include antenna 434 a and/or antenna 434 b, are collectively referred to as antenna(s) 434. Antenna(s) 434 may be configured to operate as a wireless transceiver and may be further configured to communicate with UE devices 106 via radio circuitry 430. The antenna(s) 434 may communicate with the radio circuitry 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to implement signaling for provisioning positioning-resources requested via physical layer signaling by UEs, as disclosed herein. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio circuitry 430 may be designed to communicate according to the Wi-Fi standard. Base station 102 may operate according to the various methods and aspects thereof as disclosed herein to implement signaling for provisioning positioning-resources requested via physical layer signaling by UEs.

FIG. 5—Block Diagram of Exemplary Cellular Communication Circuitry

FIG. 5 illustrates an exemplary simplified block diagram illustrative of cellular controller 352, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular controller 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular controller 352 may couple (e.g., communicatively; directly or indirectly) to one or more antennas, such as antennas 335 a-b and 336 as shown. In some aspects, cellular controller 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular controller 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular controller 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular controller 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular controller 352 may include only one transmit/receive chain. For example, the cellular controller 352 may not include the modem 520, the RF front end 540, the DL front end 560, and/or the antenna 335 b. As another example, the cellular controller 352 may not include the modem 510, the RF front end 530, the DL front end 550, and/or the antenna 335 a. In some aspects, the cellular controller 352 may also not include the switch 570, and the RF front end 530 or the RF front end 540 may be in communication, e.g., directly, with the UL front end 572.

Positioning-Assistance Data

Figure 6:
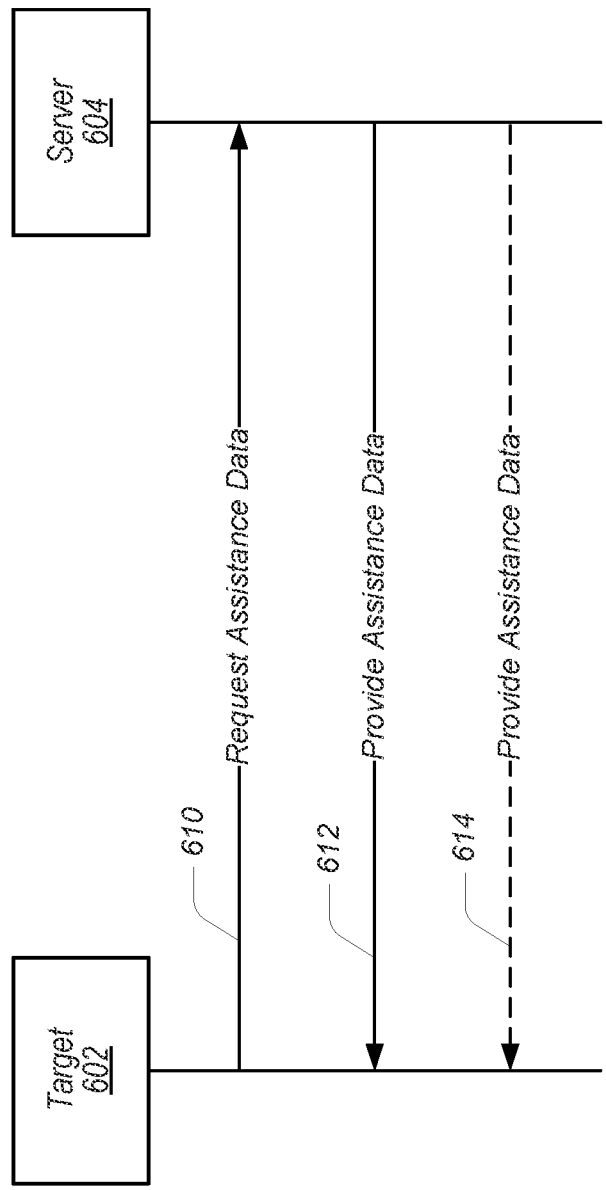
FIG. 6 shows an exemplary diagram illustrating an Assistance Data Transfer procedure according to the LTE Positioning Protocol (LPP).

As previously mentioned, LPP is a point-to-point protocol for communication between an LCS server and an LCS target device used for positioning the target device. In a cellular network, the target device, e.g., UE, may communicate with a base station (e.g., via a Uu interface, which is a radio interface between the UE and the base station), and the base station may additionally communicate with the core network (e.g., via an S1 interface, which is a user plane interface between the base station and the core network serving gateway). The core network may include the location server. A basic assistance data transfer procedure for positioning is shown in FIG. 6. The target 602 may transmit a Request Assistance Data message, via LPP, to the server 604, as indicated in communication 610. When triggered to transmit a Request Assistance Data message, the target device 602 may set the information elements (IEs)—for the positioning-method-specific request for assistance data—to request the data indicated by upper layers. The server 604 may respond with a Provide Assistance Data message containing assistance data transmitted to the target device 602 as indicated in communication 612. The transferred assistance data is intended to match or be a subset of the assistance data requested in 610. The server 604 may also provide any not requested information that the server 604 may consider useful to the target 602, as indicated in communication 614.

Observed Time Difference of Arrival (OTDOA) is a positioning feature that represents a method by which the UE measures the time difference between specific signals from several base stations and reports those time differences to a specific device in the network (e.g., to a Serving Mobile Location Center, SMLC), which then calculates the UEs' position based on these time differences and knowledge of the base station locations. For OTDOA positioning, the UE may initiate Assistant Data Transfer and/or Location Information Delivery through LPP to the Location Management Function (LMF, which is a positioning server in the control plane). As currently determined in the 3GPP standard (TS 38.805), the UE may determine that certain OTDOA positioning assistance data is desired (e.g., as part of a positioning procedure when the LMF provided assistance data is not sufficient for the UE to fulfill the request) and may transmit an LPP "Request Assistance Data" message to the LMF. The UE may send an LPP "Provide Location Information" message to the LMF. The "Provide Location Information" message may include any UE OTDOA measurements already available at the UE. The LPP signaling for the communication between the UE and the LMF as described above involve at least three interfaces. The Uu interface (for communication between the UE and base station), the NG interface (for communication between the base station and the Access and Mobility Management Function, AMF, which is a control plane function in the core network and responsible for registration management, reachability management, connection management, and mobility management), and an NLS interface (for communication between the AMF and LMF; where the NLS functions as a transport link for LPP and is transparent to all UE related and base station related positioning procedures.) The latency of the steps discussed above may depend on deployment, and can range from several milliseconds to tens of milliseconds.

Device (UE) Triggered Assistance Data with Physical Layer Signaling

As mentioned above, LPP involves multiple layer signaling, which encumbers the positioning process. In many cases, dynamic reconfiguration of positioning-resources based on or responsive to different needs of a mobile device, (e.g., of a UE) may result in greatly improved operation of the device. As will be further detailed below, a mobile device may improve its positioning by using physical layer signaling to request updates and reconfiguration of positioning-resources from a base station, and the base station may provide corresponding positioning-resources and/or assistance data in response. In one aspect, the positioning-resources may be provisioned to achieve higher positioning precision and lower positioning latency than what is possible using presently available signaling. High positioning precision typically requires a wider (or high) bandwidth PRS, which yields higher positioning resolution. However, high bandwidth measurements typically require more power consumption from the device, or UE. A wider bandwidth also represents additional overhead from the perspective of network resource utilization. Lower latency means a faster detection of location/position change if a device, which yields more accurate positioning. However, faster detection requires faster measurement rates, which also increases power consumption of the device. As disclosed herein, various aspects of physical layer signaling for reconfiguration and/or provisioning of positioning-resources and assistance data may facilitate balancing the need for higher precision and lower latency positioning with maintaining low power consumption of the device.

Pursuant to the above, physical layer signaling protocols between a device and base station may be implemented to improve the request and provisioning of positioning-resources and assistant data for device positioning. According to some aspects, a device (e.g., a UE) may trigger a physical layer (or L1) signaling for a request or a change of assistance data for positioning. The triggering may be based on specific needs of the device. For example, in certain applications the device may require higher location/position precision than in other applications. Similarly, in some cases the device may require a faster update of its location/position than in other cases. The device may assess its own positioning requirements, for example from its application layer, and may trigger the physical layer signaling for updated positioning-resources accordingly. This allows for dynamic adjustment of bandwidth and latency requirements, which results in a better balance between power consumption and precision/latency. Triggering requests for an increase and/or decrease of resources in such a manner may thereby optimize overall operation of the device. The resolution and latency of the positioning are respectively determined by different aspects of the PSR configurations. For example, a higher bandwidth may be requested for more accurate positioning, while a denser periodicity configuration may be requested for fast detection of location change. The base station may in turn indicate the resource changes to the device. In some aspects, the device may trigger such requests for a change in positioning resource configuration.

For example, the UE (device) may be initially defined with a narrowband downlink position reference signal (DL PRS) and/or uplink position sounding reference signal (UL PSRS). Such definition may include large periodicities in order to enhance the communication efficiency between the UE and the network (e.g., between the UE and the base station). The UE may determine that the current provided assistance data is not sufficient for the required accuracy and/or latency, and may trigger/request further assistance data for positioning in response. For example, the UE may request more frequency resources and/or a wideband DL-PRS and/or wideband PSRS. It is worth noting that this involves direct support for a change of bandwidth for positioning-reference-signals.

Implicit and Explicit Triggering/Request for Positioning

The above described requests for the assistance data by the UE may be implicit or explicit. For implicit requests, the request is embedded within the reporting of information from the UE to the base station. In other words, positioning measurement and/or location information reported by the UE to the base station may be evaluated as requiring a responsive adjustment of the positioning or PRS resources. For example, the UE may report positioning measurement and/or location information that indicates a change of serving cell ID, and/or a specific "Timing Measurement Quality Resolution" (TMQR) value. (The TMQR defines the resolution levels used in the Value field.) If the UE reports a TMQR of a lower value than what was initially or previously configured, the base station may adjust the PRS resources accordingly (to better correspond to the reported TMQR). In other words, if the UE reports dropping from high to low positioning resolution, such a drop may be interpreted (e.g., by the base station) to implicitly indicate that UE is requesting more DL-PRS resources, e.g., DL-PRS resources with larger bandwidth and/or shorter periodicities.

For explicit requests, the UE may request change of assistance data through indications in PUCCH or PUSCH as part of Channel State Information (CSI) payload or PUSCH payload. Such indications may include but are not limited to one or more of the following:

An index of the DL-PRS resource(s) or DL-PRS resource set(s) that the UE wishes to receive;

The spatial receive direction preferred by the UE; e.g., a DL-PRS resource index or SSB/CSI-RS (Synchronization Signal Block/Channel State Information Reference Signal) resource index;

Transmit/Receive Panel (TRP) index corresponding to where the UE expect to receive DL-PRS from (in a multi-TRP scenario the UE may expect measurements only from a certain TRP, e.g., from a TRP corresponding to the strongest signal reaching the UE);

PRS resource bandwidth;

PRS duration per slot;

PRS periodicity;

Number of PRS repetitions per periodicity;

Indicating PRS demand by transmitting a special scheduling request (SR) on a physical uplink control channel (PUCCH), such as PUCCH format 0 or PUCCH format 1;

Indicating PRS demand by transmitting a special physical random access control channel (PRACH), e.g., such as a reserved preamble or RACH occasion; or Duration for which the PRS is needed.

Network Response to Positioning Resource Requests Received via Physical Layer Signaling In response to receiving position resource requests via physical layer signaling, the base station may provide the requested assistance data indicating the adjusted resources to the UE. According to a first option, the base station may indicate the updated resources via physical layer signaling. For example, the updated resources may be indicated in a DCI (for single UE) or in a group-common DCI (for initiating positioning resource update for a group of users) or in a MAC-CE. As another example, according to a second option, legacy signaling may be used from the network side, e.g., through LPP signaling to provide assistance data and positioning-resources to the UE in response. As a further example, the base station may activate/trigger PRS resources following a UE's demand and/or without a demand from the UE.

In addition to the updated resources, the base station may also provide corresponding grants and grant-resources to the UE for the UE to use in transmitting the updated positioning measurements and/or location information corresponding to the measurements made using the updated positioning (e.g., PRS) resources. In the current specification, positioning measurement and calculation reports are transmitted by the UE on the PUSCH according to an uplink (UL) configured grant. For dynamic grants, a separate DCI is used. A dynamic grant requires additional (extra) signaling, while an UL configured grant may not be highly reliable as it does not permit link adaptation or dynamic modification of the modulation coding scheme (MCS) for adapting to channel conditions.

Indication of Grant-Resources Responsive to Positioning Resource Requests

Accordingly, in various aspects, alternatives may be provided for the base station to indicate the grant-resources on which the UE is to transmit, to the base station, measurement reports/information corresponding to measurements that were performed by the UE according to or using the updated/adjusted positioning-resources previously requested by the UE via the physical layer signaling. The base station may thus provide UE-specific UL grants without the need for a scheduling request from the UE and/or without requiring a separate DCI. Such grants/grant-resources may be provided by the base station to the UE implicitly or explicitly.

According to a first option, the grant may be implicitly provided by specifically configuring grants for the UE to transmit positioning measurement reports (e.g., as mentioned above) to the base station a specified number of symbols following the measurement gap (which is defined as the specific time period or period of time during which the UE performs inter-frequency and/or inter-RAT measurements). In other words, the resources used by the UE to transmit the UL measurement report(s) described above may be a specified number, Nx, of symbols after the end of the measurement gap. Note that when measurements are associated with PRS resources that are activated (e.g., aperiodic-PRS, activation by DCI) or triggered (E.g., semi-persistent PRS, triggering by MAC CE), the measurement gap may be dynamically indicated and/or implicitly indicated. Note further that when the measurement gap is dynamically indicated, multiple measurement gaps may be configured and the DCI may activate one of them. Note additionally that when the measurement gap is implicitly indicated, the measurement gap may be a time window which may be determined by PRS occasions. For example, the measurement gap may start $M\_1$ symbols before a first symbol of a first aperiodic PRS resource/semi-persistent PRS resource or $M\_2 >= 0$ symbols after an activation/trigger is received, where both $M\_1$ and $M\_2$ are greater than or equal to 0 symbols. Further, a measurement gap duration may be higher layer configured or may end $N\_1$ symbols after an end of last A/SP-PRS PRS resource/semi-persistent PRS resource or $N\_2$ symbols after an activation/trigger, where both $M\_1$ and $M\_2$ are greater than or equal to 0 symbols and $N\_2$ is greater than $M\_2$. This doesn't require provisioning of an additional grant as the report is simply expected to be automatically transmitted by the UE a specified number of symbols following the performance of the measurement(s) performed by the UE. Alternatively, the report may be transmitted after the end of the last symbol of the last DL-PRS resource. The specified number may be determined based on the capability of the UE. For example, Nx may depend on how quickly the UE can calculate information to be transmitted, following the measurements, or it may depend on other similar metrics affecting the time by which the UE may be ready to transmit the report.

According to a second option, the UL grant for the UE to transmit the measurement report may be explicitly provided in a DCI, e.g., as part of the PRS indication. That is, the grant may be indicated in the same DCI in which the updated resources for PRS are indicated in response to the physical signaling request previously transmitted by the UE. Accordingly, the base station may indicate such grant-resources as part of the physical layer signaling by the base station indicating the assistance data to the UE, or in case of a legacy response (e.g., using LPP signaling, as previously described above) the LMF may indicate the resource for measurement reporting to the UE as part of providing assistance data procedure via LPP signaling.

Figure 7:
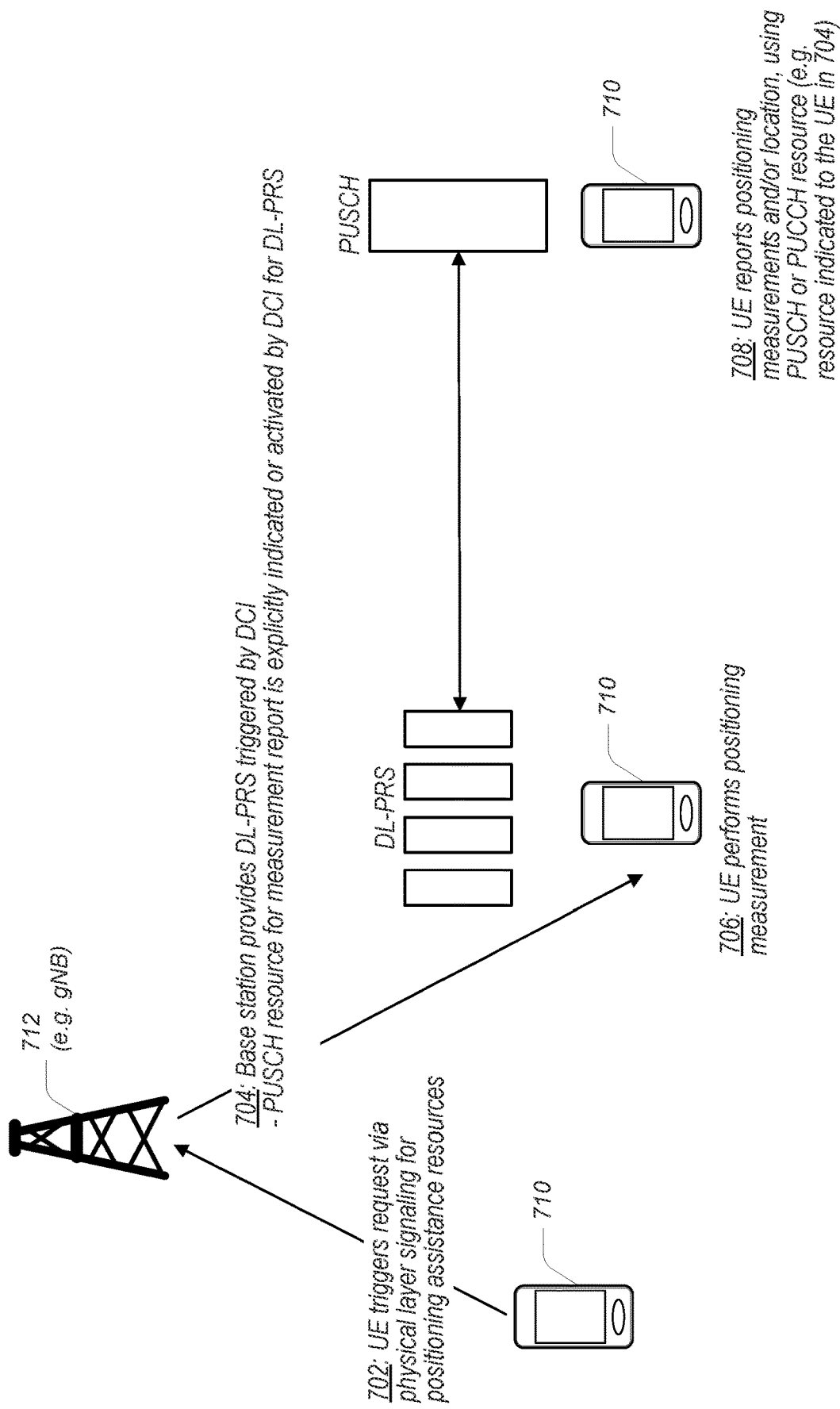
FIG. 7 shows a diagram illustrating an example of the use of physical layer signaling by a user device (UE) and a base station for requesting and obtaining positioning-resources in a wireless network, according to some aspects.

Example of UE-Triggered Physical Layer Signaling for Updated Positioning-Resources FIG. 7 shows a diagram illustrating an example of the use of physical layer signaling by a UE and a base station for requesting and obtaining updated or adjusted positioning-resources, according to some aspects. The example in FIG. 7 illustrates a physical layer procedure for the UE requesting a DL-PRS. UL Positioning-SRS resources may also be similarly indicated to UE following the UE's request for adjusted positioning requirements. As shown in FIG. 7, at 702, UE 710 triggers a physical signaling request for positioning assistance resources to base station 712. At 704, base station 712 provides DL-PRS triggered by DCI. The PUSCH grant resource for the measurement report to be transmitted by the UE 710 is explicitly indicated or activated by DCI for DL-PRS. At 706, the UE 710 performs the positioning measurements on the corresponding resources indicated in 704. At 708, the UE 710 transmits the positioning measurement report and/or location information using the PUSCH or PUCCH resource also explicitly indicated in 704. The example illustrated in FIG. 7 corresponds to the second option detailed in the previous section, according to which the UL grant for the UE to transmit the measurement report may be explicitly provided in a DCI, e.g., as part of the PRS indication.

Measurement Gaps

Once positioning-resources (e.g., PRS resources) have been indicated to the UE, subsequent measurement(s) by the UE may be performed during previously configured periodic measurement periods (referenced as "regular" measurement gaps), or during dynamically allocated measurement periods (referenced as "special" measurement gaps) intended to expedite the measurements for a faster update. In other words, at least two types of measurement gaps may be implemented. A first type of measurement gap may be an RRC configured (or preconfigured) periodic measurement gap for regular positioning needs, referenced as a "regular" measurement gap. A second type of measurement gap may be a dynamically triggered measurement gap allocated on an on-demand basis, referenced as a "special" measurement gap. Note that when measurements are associated with PRS resources that are activated (e.g., aperiodic-PRS, activation by DCI) or triggered (E.g., semi-persistent PRS, triggering by MAC CE), the measurement gap may be dynamically indicated and/or implicitly indicated (e.g., a special measurement gap). Note further, that when the measurement gap is dynamically indicated, multiple measurement gaps may be configured and the DCI may activate one of them. Note additionally, that when the measurement gap is implicitly indicated, the measurement gap may be a time window which may be determined by PRS occasions. For example, the measurement gap may start $M\_1$ symbols before a first symbol of a first aperiodic PRS resource/semi-persistent PRS resource or $M\_2 >= 0$ symbols after an activation/trigger is received, where both $M\_1$ and $M\_2$ are greater than or equal to 0 symbols. Further, a measurement gap duration may be higher layer configured or may end $N\_1$ symbols after an end of last A/SP-PRS PRS resource/semi-persistent PRS resource or $N\_2$ symbols after an activation/trigger, where both $M\_1$ and $M\_2$ are greater than or equal to 0 symbols and $N\_2$ is greater than $M\_2$. For example, in certain scenarios or instances the UE may benefit from very quick/prompt updates due to fast change of positions, and in such cases a special measurement gap may be allocated. For regular measurement gaps, the respective operations of the UE and the base station are defined such that the positioning signaling is configured not to conflict with other DL transmissions. However, for the dynamic measurement gaps, the positioning signaling may or may not overlap with other downlink signals, and the UE may therefore determine whether or not to treat any such signaling overlap(s) as an error from the base station.

Pursuant the above, the special measurement gaps may be allocated such that the UE is not expected to receive any downlink data or DL communications except DL-PRS within the special measurement gap (duration). If the DL-PRS indicated within the special measurement duration overlaps with other DL or communications, the UE may not be expected to receive the other DL communications, instead prioritizing the DL-PRS over other DL signals (e.g., such as PDSCH) within the special measurement duration. The operation of the UE under such circumstance may also depend on whether the response to the UE's previous request (via physical signaling) is received from the base station (via physical layer signaling) or the LMF (via LPP procedure). For example, if the UE receives the PRS resources from the base station via physical layer signaling within the special measurement duration then the UE may not expect to receive other DL communications during the special measurement period, otherwise the UE may prioritize reception of the DL-PRS over other DL communications during the special measurement period.

Dynamic Positioning Resource Requests

Figure 8:
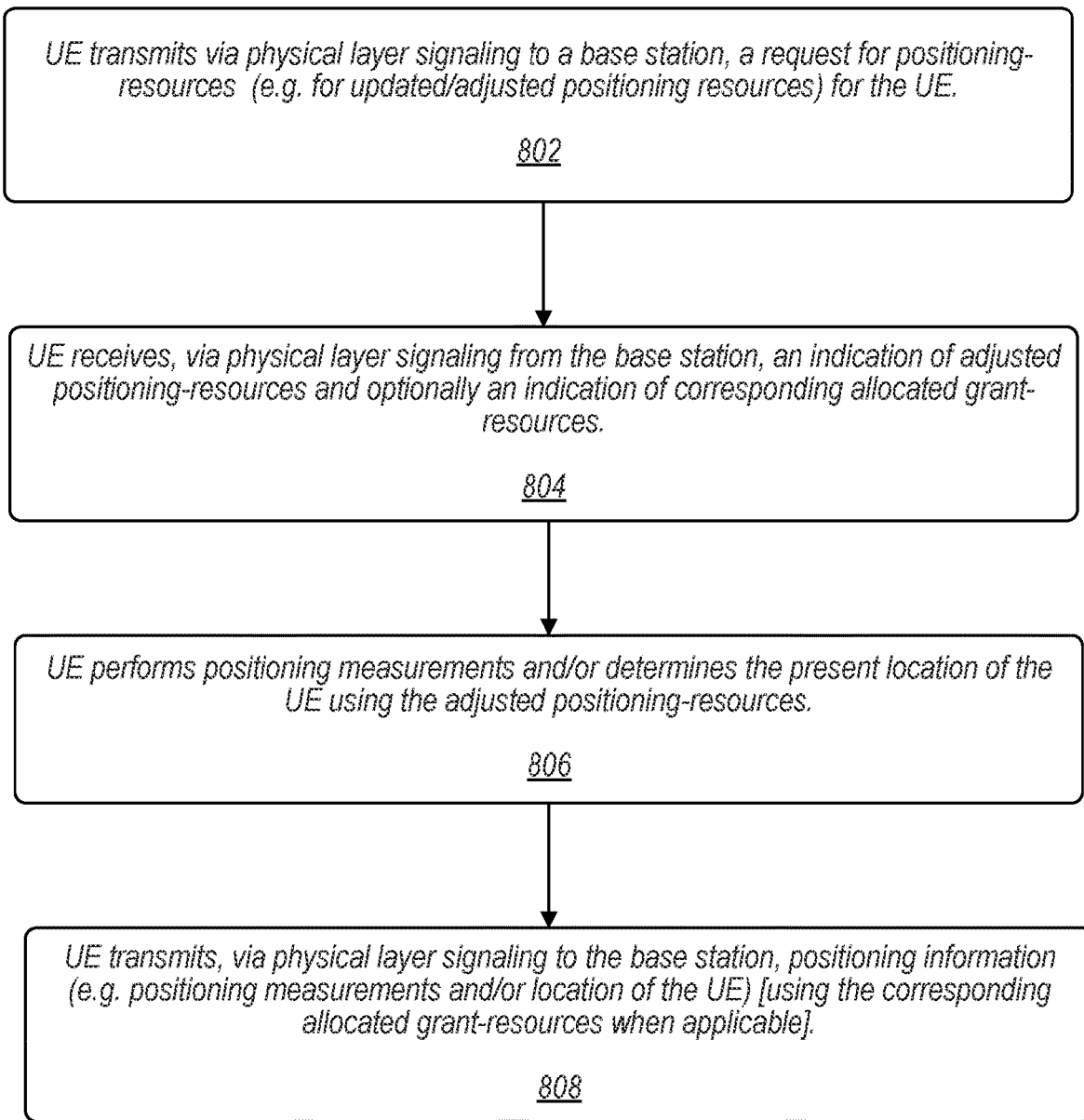
FIG. 8 shows a flow diagram of an exemplary method for a mobile device using physical layer signaling for requesting positioning-resources, according to some aspects.

FIG. 8 shows a flow diagram of an exemplary method for a mobile device, e.g., UE, using physical layer signaling for dynamically requesting positioning-resources. At 802, the UE transmits via physical layer signaling to a base station, a request for positioning-resources, e.g., for updated/adjusted positioning-resources for the UE. The UE may trigger the physical layers signaling to transmit the request in response to determining that the current positioning-resources of the UE need to be adjusted/updated. At 804, the UE receives, via physical layer signaling from the base station, an indication of adjusted positioning-resources and optionally an indication of corresponding allocated grant-resources on which to transmit positioning measurement results and/or location information. At 806, the UE performs positioning measurements and/or determines the present location of the UE using the adjusted/updated positioning-resources. At 808, the UE transmits, via physical layer signaling to the base station, positioning information (e.g., positioning measurements and/or the location of the UE), using the corresponding allocated grant-resources when applicable.

Dynamic Provisioning of Positioning-Resources

FIG. 9 shows a flow diagram of an exemplary method for a base station, e.g., gNB, dynamically provisioning positioning-resources for a UE, e.g., in response to a request received from the UE via physical layer signaling. At 902, the base station receives, via physical layer signaling from a UE, a request for positioning-resources, e.g., for updated/adjusted positioning-resources for the UE. The request may be received in response to the UE determining that the current positioning-resources of the UE need to be adjusted/updated. At 904, the base station determines adjusted positioning-resources for the UE, and optionally determines corresponding allocated grant-resources on which to receive positioning measurement results and/or location information from the UE, based on the received request. At 906, the base station transmits, via physical layer signaling to the UE, an indication of the adjusted positioning-resources and optionally transmits an indication of the corresponding allocated grant-resources as applicable. At 908, the base station receives, via physical layer signaling from the UE, positioning information (e.g., positioning measurements and/or the location of the UE). The base station may receive the positioning information on the corresponding allocated grant-resources when applicable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, in some aspects, the present disclosure may be realized as a computer-implemented method, a computer-readable memory medium, or a computer system. In other aspects, the present disclosure may be realized using one or more custom-designed hardware devices such as ASICs. In other aspects, the present disclosure may be realized using one or more programmable hardware elements such as FPGAs.

In some aspects, a non-transitory computer-readable memory medium (e.g., a non-transitory memory element) may be configured so that it stores program instructions and/or data, where the program instructions, if executed by a computer system, cause the computer system to perform a method, e.g., any of the methods described herein, or, any combination of the methods described herein, or, any subset of any of the methods described herein, or, any combination of such subsets.

In some aspects, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various methods described herein (or, any combination of the methods described herein, or, any subset of any of the methods described herein, or, any combination of such subsets). The device may be realized in any of various forms.

Any of the methods described herein for operating a user equipment (UE) or device may be the basis of a corresponding method for operating a base station or appropriate network node, by interpreting each message/signal X received by the UE in the downlink as message/signal X transmitted by the base station/network node, and each message/signal Y transmitted in the uplink by the UE as a message/signal Y received by the base station/network node.

Although the aspects above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
 a memory; and
 at least one processor in communication with the memory and configured to perform operations comprising:
  receiving, via physical layer signaling from a device, a request for positioning-resources for the device, responsive to a determination to adjust current positioning-resources of the device;
  transmitting, via physical layer signaling to the device and responsive to the request, an indication of adjusted positioning-resources; and
  receiving, from the device via physical layer signaling, positioning information on uplink resources starting at a specified number of symbols after an end of a measurement period during which positioning measurements are performed, wherein the positioning information is indicative of one or more of:
   positioning measurements performed by the device using the adjusted positioning-resources; or
   a location of the device determined using the adjusted positioning-resources.

2. The apparatus of claim 1,
 wherein the determination to adjust the current positioning-resources comprises one of:
  a determination that the current positioning-resources are insufficient for required positioning accuracy and/or positioning latency of the device;
  a determination that the current positioning-resources exceed what is necessary for required positioning accuracy and/or positioning latency of the device; or
  a determination that the device intends to reduce its power consumption.

3. The apparatus of claim 1,
 wherein the request is either implicitly indicated in specific positioning measurement and/or location information received via the physical layer signaling, or explicitly indicated as resource information received on one or more physical uplink channels via the physical layer signaling.

4. The apparatus of claim 3,
 wherein the resource information is included as part of one or more of:
  control state information received on a physical uplink control channel; or
  data payload received on a physical uplink data channel.

5. The apparatus of claim 3,
 wherein the specific positioning measurement and/or location information comprises one or more of:
  an indication of a change in serving cell for the device; or
  a current positioning resolution for the device.

6. The apparatus of claim 3,
 wherein the resource information comprises one or more of:
  an index of positioning-resources and/or resource sets requested by the device;
  a spatial receive direction preferred by the device;
  a transmit/receive panel index corresponding to where the device expects to receive positioning reference signals (PRSs) from;
  PRS bandwidth;
  PRS duration per slot;
  PRS periodicity;
  number of PRS repetitions per periodicity;
  a PRS demand transmitted via a special scheduling request (SR) on a physical uplink control channel (PUCCH);
  a PRS demand transmitted via a special physical random access control channel (PRACH); or
  time duration for which the PRS is required by the device.

7. The apparatus of claim 1,
 wherein the operations further comprise:
  determining the adjusted positioning-resources based at least on the received request.

8. The apparatus of claim 1,
 wherein transmitting the indication of adjusted positioning-resources comprises transmitting the indication of adjusted positioning-resources as part of one or more of:
  device specific downlink control information (DCI);
  group-common DCI; or
  a media access control (MAC) control element.

9. The apparatus of claim 1,
wherein the operations further comprise:
transmitting, to the device and responsive to the request, an indication of grant-resources on which the device is to transmit the positioning information.

10. The apparatus of claim 9,
wherein transmitting the indication of grant-resources comprises transmitting the indication of grant-resources together with the indication of adjusted positioning-resources.

11. The apparatus of claim 10,
wherein the indication of grant-resources and the indication of adjusted positioning-resources are indicated by downlink control information transmitted to the device on a physical downlink control channel.

12. The apparatus of claim 1,
wherein the specified number is determined based on a capability.

13. A base station, comprising:
a radio; and
a processing element operatively coupled to the radio;
wherein the processing element is configured to cause the base station to:
receive, via physical layer signaling from a device, a request for positioning-resources for the device, responsive to a determination to adjust current positioning-resources of the device;
transmit, via physical layer signaling to the device and responsive to the request, an indication of adjusted positioning-resources; and
receive, from the device via physical layer signaling, positioning information on uplink resources starting at a specified number of symbols after an end of a measurement period during which positioning measurements are performed, wherein the positioning information is indicative of one or more of:
positioning measurements performed by the device using the adjusted positioning-resources; or
a location of the device determined using the adjusted positioning-resources.

14. The base station of claim 13,
wherein the specified number is determined based on a capability of the device.

15. The base station of claim 13,
wherein the measurement period is one of:
a preconfigured measurement period reserved for performing measurements; or
a measurement period specifically allocated for performing the positioning measurements.

16. The base station of claim 15,
wherein the processing element is further configured to cause the base station to:
transmit positioning reference signals to the device according to the adjusted positioning resources without additional downlink communications during the specifically allocated measurement period.

17. A non-transitory computer readable memory medium storing program instructions executable by processing circuitry to cause a base station to:
receive, via physical layer signaling from a device, a request for positioning-resources for the device, responsive to a determination to adjust current positioning-resources of the device;
transmit, via physical layer signaling to the device and responsive to the request, an indication of adjusted positioning-resources; and
receive, from the device via physical layer signaling, positioning information on uplink resources starting at a specified number of symbols after an end of a measurement period during which positioning measurements are performed, wherein the positioning information is indicative of one or more of:
positioning measurements performed by the device using the adjusted positioning-resources; or
a location of the device determined using the adjusted positioning-resources.

18. The non-transitory computer readable memory medium of claim 17,
wherein the determination to adjust the current positioning-resources comprises one of:
a determination that the current positioning-resources are insufficient for required positioning accuracy and/or positioning latency of the device;
a determination that the current positioning-resources exceed what is necessary for required positioning accuracy and/or positioning latency of the device; or
a determination that the device intends to reduce its power consumption.

19. The non-transitory computer readable memory medium of claim 17,
wherein the request is either implicitly indicated in specific positioning measurement and/or location information received by the base station via the physical layer signaling, or explicitly indicated as resource information received on one or more physical uplink channels via the physical layer signaling.

20. The non-transitory computer readable memory medium of claim 19,
wherein the resource information is included as part of one or more of:
control state information received on a physical uplink control channel; or
data payload received on a physical uplink data channel.

* * * * *